(12) United States Patent  
Scott et al.

(10) Patent No.: US 10,488,140 B2  
(45) Date of Patent: Nov. 26, 2019

(54) HINGE ASSEMBLY WITH STOPS (71) Applicant: Action Target Inc., Provo, UT (US)

(72) Inventors: Jonathan M. Scott, Spanish Fork, UT (US); Robert DeCosta, Spanish Fork, UT (US)

(73) Assignee: Action Target Inc., Provo, UT (US)

( * ) Notice: Subject to any disclaimer, the term of this patent is extended or adjusted under 35 U.S.C. 154(b) by 0 days.

(21) Appl. No.: 15/851,302

(22) Filed: Dec. 21, 2017

(65) Prior Publication Data

US 2018/0180373 A1 Jun. 28, 2018

Related U.S. Application Data (60) Provisional application No. 62/438,386, filed on Dec. 22, 2016.

(51) Int. Cl.  
*F41A 23/06* (2006.01)  
*F16M 13/02* (2006.01)  
*F41C 33/04* (2006.01)  
*F41A 23/00* (2006.01)  
*F41A 23/18* (2006.01)

(52) U.S. Cl.  
CPC ........... *F41A 23/06* (2013.01); *F16M 13/022* (2013.01); *F41A 23/00* (2013.01); *F41A 23/18* (2013.01); *F41C 33/041* (2013.01)

(58) Field of Classification Search  
CPC .......... F41A 23/06; F41A 23/16; F41A 23/08; F41A 23/02; F41A 23/00; F16M 13/022; F41C 33/041; F41C 33/043; F41C 33/045; F41C 33/001

USPC ................. 248/290.1, 214; 43/21.2  
See application file for complete search history.

(56) References Cited

U.S. PATENT DOCUMENTS

| 1,213,808 | A |   | 1/1917  | Page |
|-----------|---|---|---------|------|
| 1,835,419 | A |   | 9/1929  | Milhime |
| 2,047,107 | A |   | 1/1935  | Milhime |
| 3,333,294 | A |   | 8/1967  | Warner |
| 4,074,884 | A |   | 2/1978  | Antoszewski |
| 4,501,045 | A |   | 2/1985  | Boyer |
| 4,551,939 | A | * | 11/1985 | Kitchens ................ A01K 97/10 248/513 |
| 4,650,144 | A |   | 3/1987  | Conrad |
| 4,690,361 | A |   | 9/1987  | Lundman |
| 4,827,654 | A | * | 5/1989  | Roberts .................. A01K 97/10 248/514 |
| 5,078,276 | A |   | 1/1992  | Rogge et al. |
| 5,219,134 | A | * | 6/1993  | Morita ..................... H02G 3/26 248/224.7 |
| 5,313,734 | A | * | 5/1994  | Roberts .................. A01K 97/10 248/514 |

(Continued)

Primary Examiner — Nkeisha Smith  
(74) Attorney, Agent, or Firm — Bateman IP (57) ABSTRACT A rifle holder hinge mechanism comprising a support block with rifle hook attached thereto, the support block having a sleeve for receiving a hinge pin, and a hinge block, the hinge block having a hinge block sleeve, with a hinge pin rotatable within the hinge block sleeve. The support block further comprises a projection or detent, and the hinge block further comprise a cutaway or recess configured to receive the detent and limit rotation of the detent of the support block relative to the hinge block. Rotation may be limited 90 degrees such that the rifle holder hinge mechanism has a first position for receiving a weapon and a second position when it is not in use.

17 Claims, 5 Drawing Sheets (56) References Cited

U.S. PATENT DOCUMENTS

| | | | |
|---|---|---|---|
| 5,724,763 A | 3/1998 | Rasmussen | |
| 5,915,672 A | 6/1999 | Dickey | |
| 5,979,099 A | 11/1999 | Kervin | |
| D423,334 S | 4/2000 | Laga et al. | |
| 6,578,309 B1 | 6/2003 | Frisce | |
| 6,626,409 B1 * | 9/2003 | Thompson | A01K 97/10 248/520 |
| D482,557 S | 11/2003 | Shih | |
| 6,896,232 B2 | 5/2005 | Crowell et al. | |
| D513,819 S | 1/2006 | Ji | |
| 7,240,885 B1 | 7/2007 | Sullivan | |
| 9,072,287 B2 * | 7/2015 | Holzer | A01K 97/10 |
| 9,163,893 B1 * | 10/2015 | Gutierrez | F41A 23/16 |
| 9,987,993 B2 * | 6/2018 | Thorimbert | B60R 7/14 |
| 2007/0090252 A1 * | 4/2007 | Chou | A47G 25/065 248/304 |
| 2013/0086835 A1 | 4/2013 | Minneman | |
| 2013/0277524 A1 * | 10/2013 | Fathi | F16B 45/02 248/308 |
| 2017/0361776 A1 * | 12/2017 | Thorimbert | B60R 7/14 |
| 2018/0058795 A1 * | 3/2018 | Scott | F41A 23/34 |
| 2018/0107094 A1 * | 4/2018 | Yowler | G03B 15/02 |
| 2018/0180372 A1 | 6/2018 | Scott et al. | |
| 2018/0180373 A1 | 6/2018 | Scott et al. | |

\* cited by examiner

HINGE ASSEMBLY WITH STOPS

TECHNICAL FIELD

The present invention relates to a hinge assembly for a rifle support or for firearm cases.

BACKGROUND

In range shooting, shooters often alternate weaponry during shooting practice in an effort to gain proficiency on a variety of weapons, including smaller weapons such as handguns, as well as larger weapons such as rifles. Organization of multiple weapons in a small shooting stall can be problematic, particularly with larger weapons that may take up excessive space in a shooting stall. Accordingly, there is a need to provide structures that assist in organization of weapons and that are unobtrusive and can be minimized during shooting practice.

SUMMARY OF INVENTION

The present invention relates to a hinge assembly for holding rifles, shotguns and cases for such weapons. The hinge assembly may comprise a hinge block having a sleeve and a recess, such as cutaway portion, at a top end having a first side stop and a second side stop; a hinge pin rotatable within the hinge block sleeve; a support block including an indentation or detent configured to engage with the first side stop and second side stop of the cutaway portion upon rotation and a hinge pin retainer at a bottom end; and a rifle holder hook attached to the support block.

In another embodiment, the cutaway portion first side stop and second side stop may be oriented at positions wherein rotation is limited to an angle of about 90 degrees.

In yet another embodiment, the detent may be configured to engage with the first side stop and arrest rotation of the hinge pin at a first position where the rifle holder hook is parallel with the mounting bracket and engage with the second side stop and arrest rotation of the hinge pin at a second position where the rifle holder hook is positioned perpendicular to the mounting bracket to receive a rifle.

In another embodiment, the first side stop and second side stop of the cutaway portion of the hinge block may be integral with the hinge block. In another configuration, the cutaway portion may be provided on the support block, and the detent may be provided on the hinge block.

BRIEF DESCRIPTION OF THE SEVERAL VIEWS OF THE DRAWINGS

The following drawings illustrate what are currently considered to be specific representative configurations for carrying out the invention and are not limiting as to embodiments which may be made in accordance with the present invention. The components in the drawings are not necessarily to scale relative to each other. Like reference numerals designate corresponding parts throughout the several views.

DETAILED DESCRIPTION

The following provides a detailed description of particular embodiments of the present invention. Reference will now be made to the drawings in which the various elements of the illustrated configurations will be given numerical designations and in which the invention will be discussed so as to enable one skilled in the art to make and use the invention. It is to be understood that the following description is only exemplary of the principles of the present invention, and should not be viewed as narrowing the scope of the claims which follow, which claims define the full scope of the invention.

It will be appreciated that various aspects discussed in one drawing may be present and/or used in conjunction with the embodiment shown in another drawing, and each element shown in multiple drawings may be discussed only once. For example, in some cases, detailed description of well-known items or repeated description of substantially the same configurations may be omitted. The reason is to facilitate the understanding of those skilled in the art by avoiding the following description from being unnecessarily redundant. The accompanying drawings and the following description are provided in order for those skilled in the art to fully understand the present disclosure, and these are not intended to limit the gist disclosed in the scope of claims.

The present invention generally relates to a rifle support device having a hinge assembly that allows the support device to be minimized and placed inconspicuously out of the way when not in use. As used herein, the term "rifle" is used to refer to any long weapon, including single shot bolt action rifles, automatic and semi-automatic rifles, shotguns, etc.

The following provides a detailed description of a single hinge assembly. It is understood that two or more hinge assemblies will typically be used together to provide a plurality, typically two but sometimes more, hinge assemblies mounted near one another may form two supports for the front and rear of a rifle.

One particular embodiment of the present invention is shown and described in the drawings. A rifle holder hinge assembly is provided having stops that limit rotation to about 90 degrees, for example, by machining out a portion of the rifle holder hook support block and hinge block which cause them to interlock when assembled. Alternatively, the blocks may be molded or otherwise formed. The interlocking area limits rotation of the rifle holder hook to 90 degrees, so that when not in use the rifle holder hook can be rotated flush against mounting bracket, and when in use can be pivoted outwardly from the mounting bracket to position the rifle holder hook to receive and support a rifle.

Figure 1:
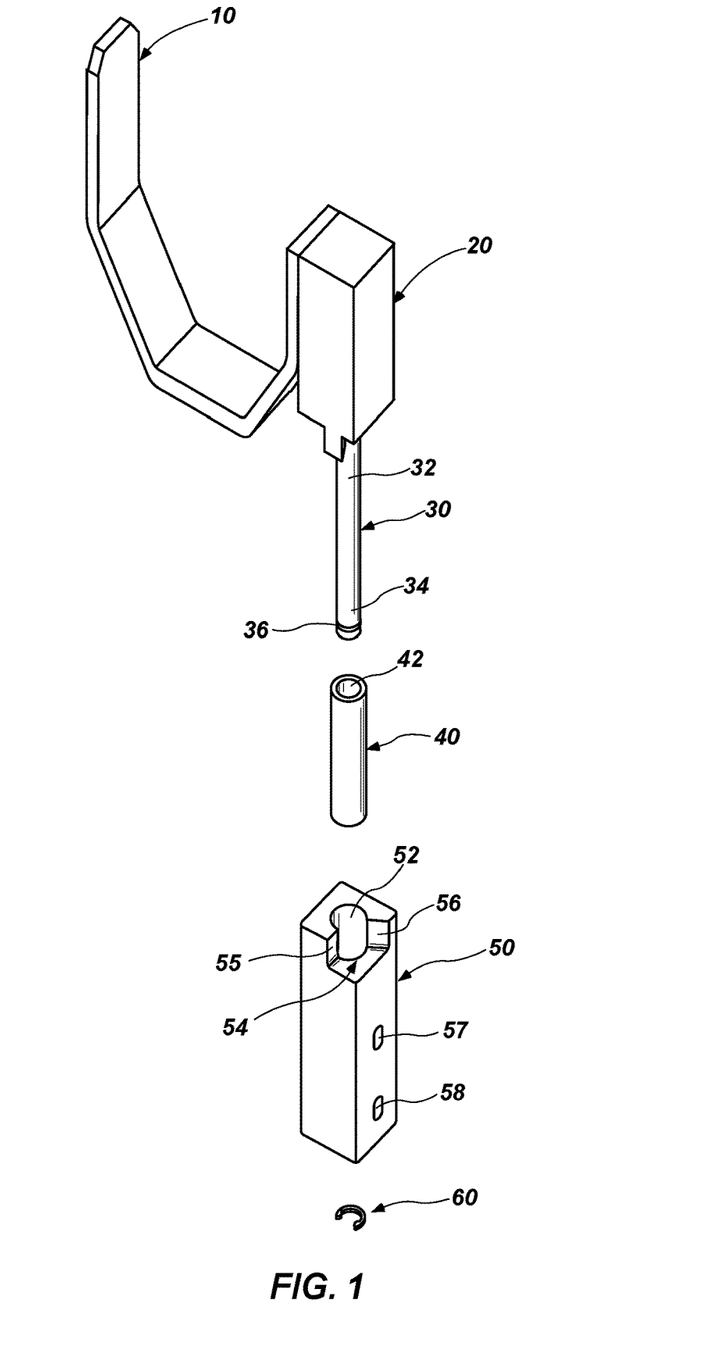
FIG. 1 is an exploded perspective view of a hinge mechanism made in accordance with the present disclosure.

FIG. 1 shows an exploded view of one specific embodiment of a rifle holder hinge assembly in accordance with the present invention. The rifle holder hinge assembly comprises a rifle holder hook 10 attached to a support block 20, to which the top portion 32 of hinge pin 30 is attached. The rifle holder hook 10 may be fixed to the support block 20 by any suitable means, such as welding, adhesives or press fitting with a tight tolerance, etc.

Figure 2:
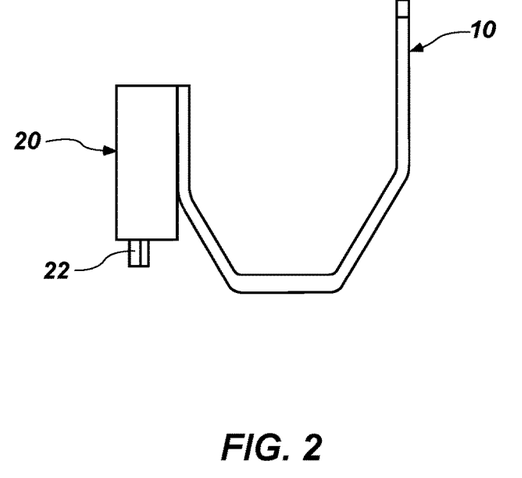
FIG. 2 is a side view of the rifle hook fixed to a support block.
Figure 3:
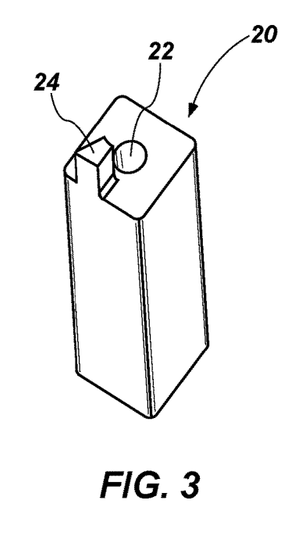
FIG. 3 is a bottom perspective view of a rifle hook support block.
Figure 4:
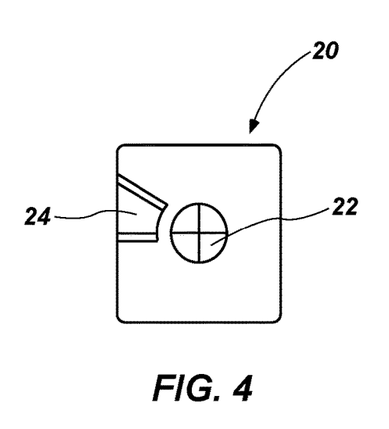
FIG. 4 is a bottom view of the rifle hook support block.
Figure 5:
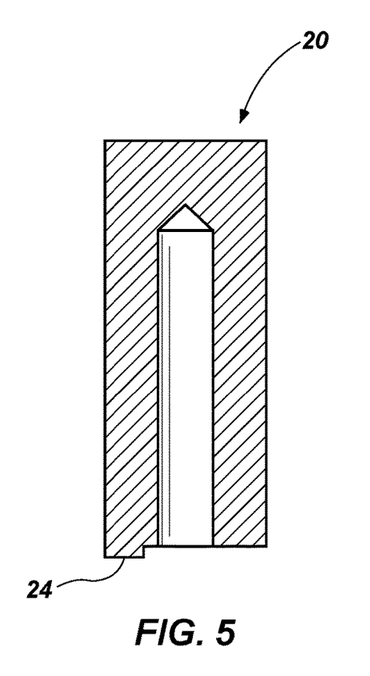
FIG. 5 is a side sectional view of the rifle hook support block.

FIG. 2 shows a side view of the support block 20 attached to a rifle holder hook 10. FIGS. 3-5 show support block 20 (without the rifle holder hook) with a hole 22 configured to receive the hinge pin 30 and detent 24, which engages with stops 55 and 56 of hinge block 50 (shown in FIGS. 6-7) to limit rotation of the hinge pin 30. FIG. 3 is a bottom perspective view of a rifle hook support block 20 showing detent 24. FIG. 4 is a bottom view of the rifle hook support block 20. FIG. 5 is a side sectional view of the rifle hook support block 20, showing cylindrical hole 22 configured to receive the hinge pin 30.

FIG. 1 further shows hinge block 50 having a cylindrical bore or sleeve 52 which is a cylindrical hole that extends through the length of hinge block 50. Sleeve 52 of hinge block 50 is configured to receive and support the hinge pin 30 which may be rotatable within the sleeve 52. (It will be appreciated that the hinge pin need not have a round cross-section throughout its length as hinge pin only needs to rotate within one of the support block 20 or hinge block 50). As further shown in FIG. 1, rifle holder hook 10 is attached to a top portion of the hinge pin 30 via support block 20.

Also shown in FIG. 1 is an optional sleeve washer 40, which is a cylindrical washer having a cylindrical hole 42. The sleeve washer 40 is positioned around the hinge pin 30 so that when the hinge pin 30 is placed within the sleeve 52 of hinge block 50 the sleeve washer 40 is between the hinge pin 30 and the sleeve 52 of hinge block 50 to provide smooth rotation. It will be appreciated that the sleeve washer 40 could also be made to be positioned in the support block 20 so that it is the support block which rotates relative to the hinge pin.

Figure 6:
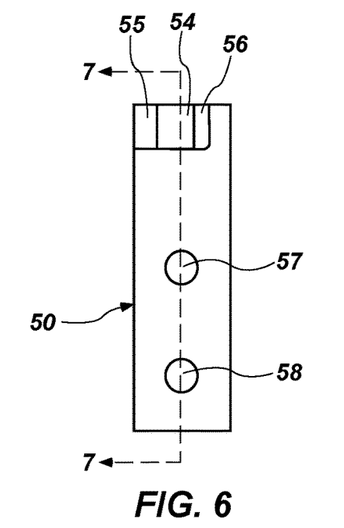
FIG. 6 is a side view of the hinge block.
Figure 7:
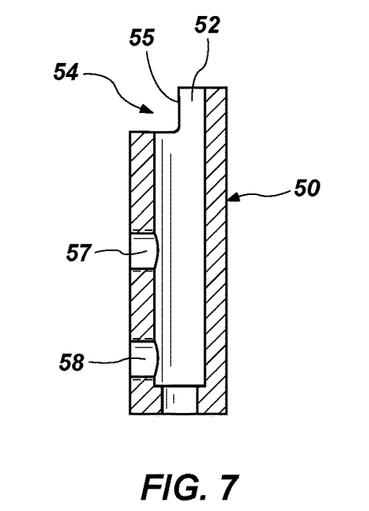
FIG. 7 is a sectional view of the hinge block taken along the line 7-7 in FIG. 6.

FIGS. 6 and 7 show further details of the hinge block 50, which includes threaded holes 57 and 58 for mounting the hinge block 50 to mounting holes 77 and 78 of mounting bracket 70 (shown in FIG. 9) with suitable threaded bolts (not shown) or other fasteners. FIG. 6 shows a side view of the hinge block, and FIG. 7 shows a sectional view of the hinge block. Hinge block 50 may have a cylindrical hole or sleeve 52 configured to receive the hinge pin 30. Threaded holes 57 and 58 may also be used for mounting the hinge block 50 directly to a wall, such as the wall of a shooting stall.

Also shown in FIGS. 1, 6 and 7, hinge block 50 has a recess or cutaway portion 54 formed therein at a top end 51 having a first side stop 55 and a second side stop 56, with which the detent or projection 24 of support block 20 engages to limit rotation. Hinge pin 30 may be rotatable within the sleeve 52 of hinge block 50 or the bore 22 of the support block 20 so that the relative positions of the support block and the hinge block may be changed.

When hinge pin 30 is inserted into sleeve 52 of hinge block 50, the detent 24 of support block 20 fits within the cutaway portion 54 of hinge block 50. When the rifle holder hook 10, and support block 20 are rotated, projection or detent 24 moves back and forth between the first side stop 55 and second side stop 56 of the cutaway portion 54 to engage with the first side stop 55 and second side stop 56.

Figure 9:
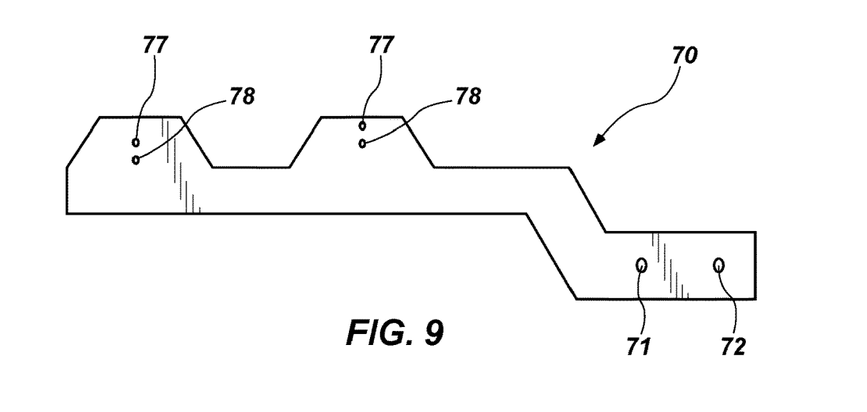
FIG. 9 is a front view of a rifle holder mounting bracket.
Figure 10:
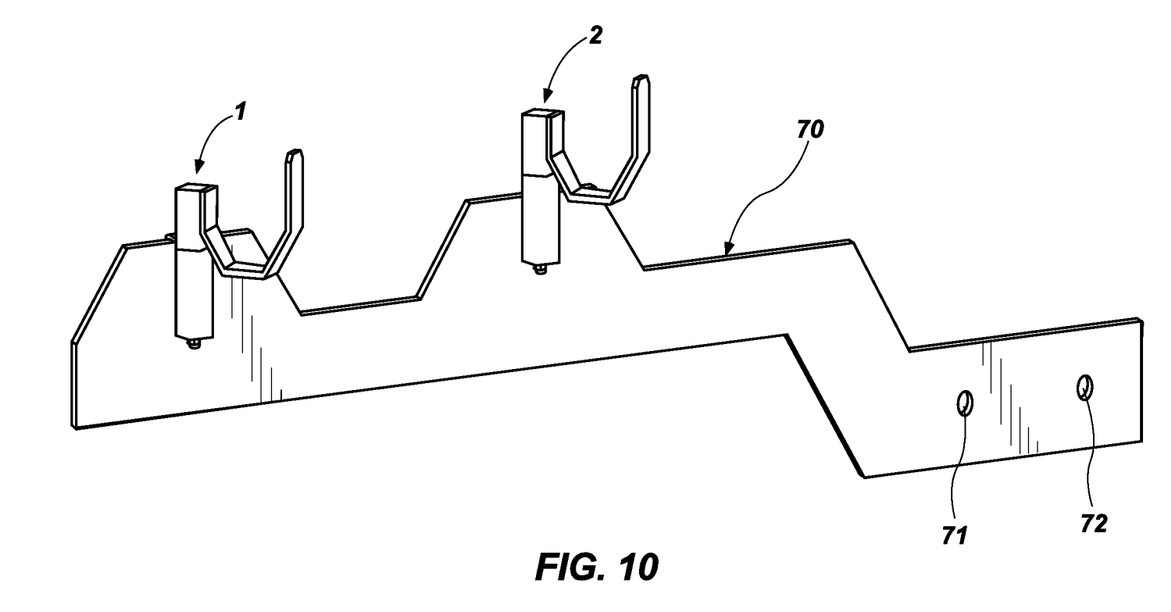
FIG. 10 is a view with two hinge assemblies mounted to the rifle holder mounting bracket.

The hinge block 50 is mountable to a rifle holder mounting bracket 70, shown separately in FIG. 9 and shown with two hinge assemblies mounted to it in FIG. 10.

Figure 8:
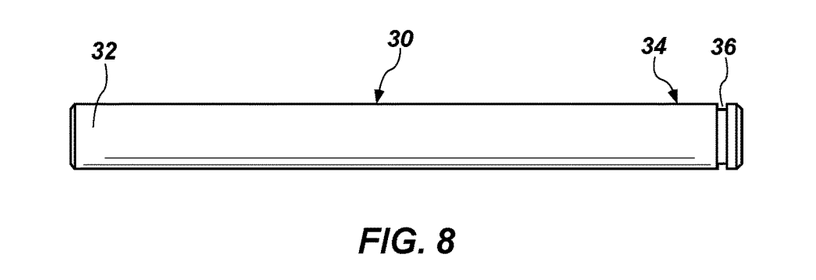
FIG. 8 is a side view of the hinge pin.

FIG. 8 shows hinge pin 30 having a hinge pin retainer in the form of an annular groove 36 at a bottom end 34 for receiving a retaining collar 60 (collar 60 can be seen in FIG. 1). It is understood that other suitable hinge pin retainers may be utilized, such as a cotter pin inserted through a hole in the end of the hinge pin 30. In addition, pressure on the hinge assembly may be provided by placing a washer and/or a spring (not shown) between the hinge block 50 and the retaining collar 60. For example, a suitable spring may include a disc spring that provides tension or pressure between the hinge block 50 and the retaining collar 60, which will provide friction to prevent free rotation of the hinge pin 30 within sleeve 52. Any other suitable tensioning springs known to those skilled in the art may also be used, such as a standard coil spring, a poly wave spring, a malleable plastic compression spring, etc.

Likewise, the hinge pin may be press fit or otherwise secured in the hinge block 50 and support block 20 allowed to pivot with respect to the hinge pin. In such a configuration, a retaining mechanism may not be necessary.

In one aspect, the first side stop 55 and second side stop 56 as shown in FIGS. 5 and 6, are positioned such that rotation is limited to an angle of about 90 degrees. In other words, the first side stop 55 and the second side stop 56 are spaced apart about 90 degrees or have an angular distance of about 90 degrees (where the axis of rotation is the pin hinge).

In another embodiment, projection or detent 24 is configured to engage with the first side stop 55 and arrest rotation of the hinge pin 30 at a first position where the rifle holder hook is parallel with the support bracket and engage with the second side stop 56 and arrest rotation of the hinge pin at a second position where the rifle holder hook is positioned perpendicular to the support bracket to receive a rifle.

In yet another embodiment, the first side stop 55 and second side stop 56 of the cutaway portion 54 of the hinge block 50 are integral with the hinge block. For example, the cutaway portion of the hinge block 50 may be formed by machining out a corner of the hinge block 50 to form the cutaway portion.

Figure 11:
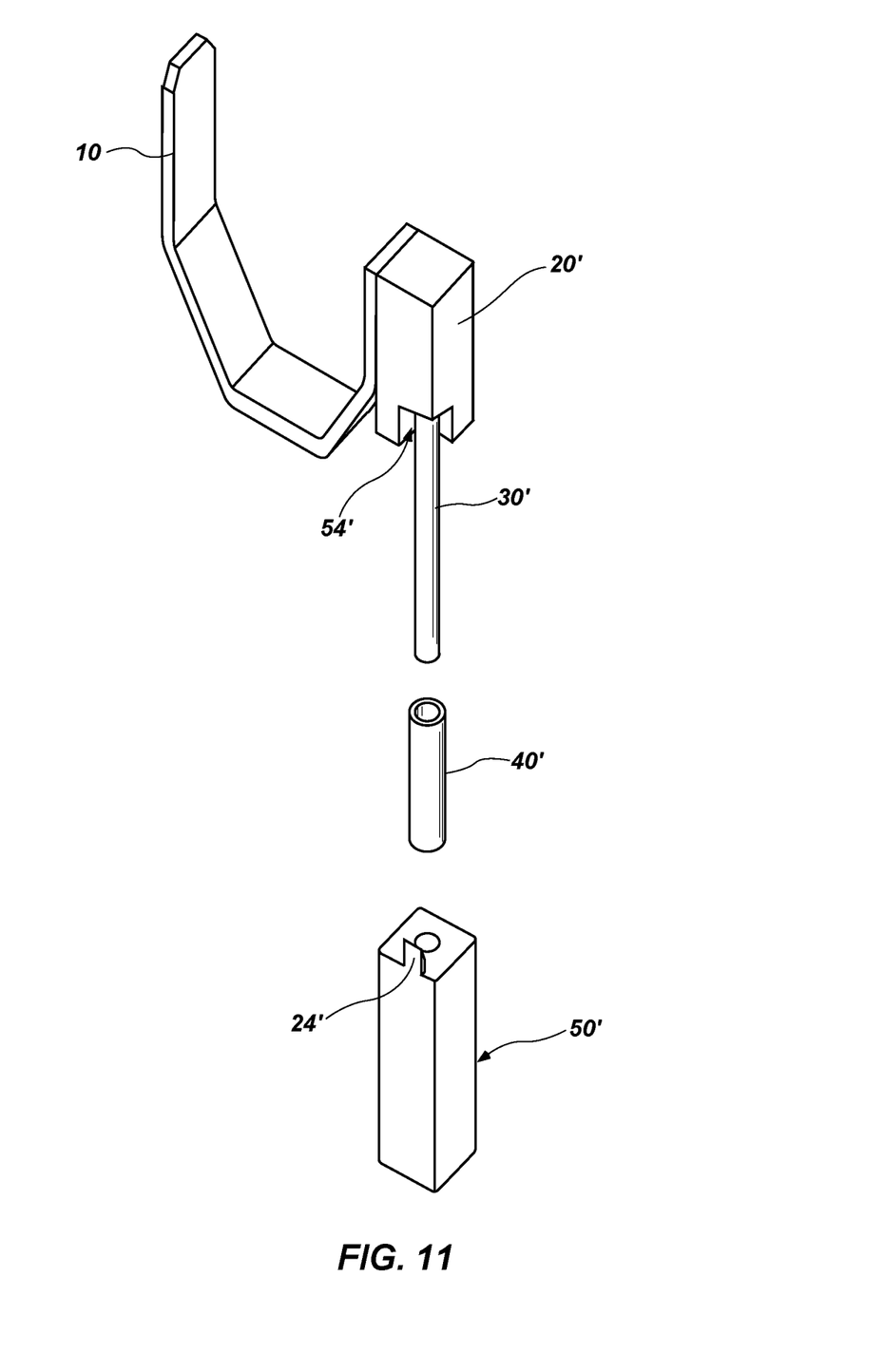
FIG. 11 is an exploded diagram of another embodiment of the hinge mechanism.

According to another aspect, the cutaway portion 54 of the hinge block 50 and the detent 24 of the support block 20 may be reversed. In such a configuration, the support block 20 is provided with a cutaway portion, and the hinge block 50 is provided with a detent. The support block 20 having the rifle holder hook 10 would still be limited in its rotation relative to the hinge block about 90 degrees. FIG. 11 shows an exploded view of a rifle holder hinge assembly with a support block 20' having a cutaway 54' and a hinge block 50' having a detent 24'. It will be appreciated that the washer 40' may be in mounted in either the support block 20' or the hinge block 50' provided that the two structures can pivot which respect to one another.

FIG. 9 shows a support bracket 70, with mounting holes 71 and 72 for mounting to a wall structure, and mounting holes 77 and 78 for mounting a hinge assembly to the mounting bracket. It will be appreciated that hinge block 50 may also be directly mounted onto a surface, such as the wall of a shooting stall.

FIG. 10 shows two hinge assemblies 1 and 2 mounted to a mounting bracket 70.

While the invention has been described in particular with reference to certain illustrated configurations, such is not intended to limit the scope of the invention. The present invention may be embodied in other specific forms without departing from its spirit or essential characteristics. The described configurations are to be considered as illustrative and not restrictive. The scope of the invention is, therefore, indicated by the appended claims rather than by the foregoing description. All changes which come within the meaning and range of equivalency of the claims are to be embraced within their scope.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A rifle holder hinge assembly comprising:
   a hinge support having a rifle holder hook attached thereto;
   a hinge block;
   a hinge pin engaging the hinge support and the hinge block so that the hinge support can pivot with respect to the hinge block;
   wherein at least one of the hinge support and the hinge block has a recess with stops formed therein, and wherein an other of the at least one of the hinge support and the hinge block has a projection or detent which extends into the recess to selectively engage the stops and thereby limit pivoting of the hinge support relative to the hinge block; and
   wherein the recess comprises a cutaway portion and wherein the stops comprise a first side stop and second side stop of the cutaway portion oriented at positions wherein the detent or projection rotates between the first side stop and the second side stop and wherein rotation of the detent or projection is limited to an angle of about 90 degrees.

2. The hinge assembly of claim 1, wherein the detent is configured to engage with the first side stop and arrest rotation of the hinge pin at a first position where the rifle holder hook is parallel with a mounting bracket and engage with the second side stop and arrest rotation of the hinge support at a second position where the rifle holder hook is positioned perpendicular to the mounting bracket to receive a rifle and wherein the cutaway portion is open between the first side stop and the second side stop in an actuate path.

3. The hinge assembly of claim 1, wherein the first side stop and the second side stop of the recess of the hinge block are formed integrally with the hinge block.

4. The hinge assembly of claim 1, wherein the hinge block and the hinge support each has a first generally flat exterior side and a second generally flat exterior side, and wherein the detent is disposed along a first generally flat exterior side of one of the hinge block and the hinge support and wherein the detent extends along the first generally flat exterior side and the second generally flat exterior side of one of the hinge block and the hinge support.

5. The hinge assembly of claim 4, further comprising a mounting bracket and wherein the mounting bracket is attached to the first generally flat exterior side of the hinge block.

6. A rifle holder hinge assembly, comprising:
   a hinge block having a hinge block sleeve and a cutaway portion at a top edge thereof;
   a hinge pin rotatable within the hinge block sleeve;
   a support block fixedly attached to the hinge pin, the support block having a detent at a bottom portion thereof configured to engage with the cutaway portion of the hinge block; and
   a rifle holder hook attached to a top portion of the hinge pin; and
   wherein the cutaway comprises a first side stop and second side stop and defines a void between the first side stop and the second side stop, the detent being able to pivot between the first side stop and the second side stop, the detent being formed integrally with the support block.

7. The hinge assembly of claim 6, wherein the first side stop and second side stop are spaced apart about 90 degrees and open therebetween so that the hook may pivot about 90 degrees while the detent is in the cutaway.

8. The hinge assembly of claim 6, wherein the detent is configured to engage with the first side stop and arrest rotation of the hinge pin at a first position where the rifle holder hook is parallel with a mounting bracket and engage with the second side stop and arrest rotation of the hinge pin at a second position where the rifle holder hook is positioned perpendicular to the mounting bracket to receive a rifle and wherein the detent moves through the void continuously between the first side stop and the second side stop so that the rifle holder hook is moveable continuously between the first position and the second position.

9. The hinge assembly of claim 6, further comprising a cylindrical washer positioned around the hinge pin.

10. The hinge assembly of claim 6, further comprising a mounting bracket, and wherein the hinge block is fixedly mounted to the mounting bracket with the cutaway portion flush with the mounting bracket.

11. The hinge assembly of claim 6, wherein the hinge block and the support block each has a first generally flat exterior side and a second generally flat exterior side, and wherein the detent extends from the first generally flat exterior side of the hinge block and wherein the detent extends along the first generally flat exterior side and the second generally flat exterior side at a top portion of the support block.

12. The hinge assembly of claim 11, further comprising a mounting bracket and wherein the mounting bracket is attached to the first generally flat exterior side of the hinge block.

13. A rifle holder hinge assembly, comprising:
   a hinge block having a hinge block sleeve and a detent at a top end thereof;
   a hinge pin rotatable within the hinge block sleeve;
   a support block fixedly attached to the hinge pin, the support block having a cutaway portion at a bottom end thereof configured to engage with the detent of the hinge block; and
   a rifle holder hook attached to the support block; and
   wherein the cutaway portion comprises a first side stop and second side stop and wherein the detent is movable between the first side stop and the second side stop to allow repositioning of the hinge block relative to the support block.

14. The hinge assembly of claim 13, wherein the first side stop and second side stop are spaced apart about 90 degrees so that the hinge block and support block may rotate about 90 degrees to one another while the detent is in the cutaway portion.

15. The hinge assembly of claim 13, wherein the detent engages with the first side stop and arrests rotation of the hinge pin at a first position where the rifle holder hook is parallel with a mounting bracket and engages with the second side stop and arrests rotation of the hinge pin at a second position where the rifle holder hook is positioned perpendicular to the mounting bracket to receive a rifle.

16. The hinge assembly of claim 13, further comprising a cylindrical washer positioned around the hinge pin.

17. The hinge assembly of claim 13, wherein the hinge block and the support block each has a first generally flat exterior side and a second generally flat exterior side, and wherein the detent extends from the first generally flat exterior side of the support block and wherein the detent extends along the first generally flat exterior side and the second generally flat exterior side at a top portion of the hinge block.

* * * * *